(12) United States Patent
Marti Sala et al.

(10) Patent No.: US 8,096,403 B2
(45) Date of Patent: Jan. 17, 2012

(54) MACHINE FOR ORIENTING AND ALIGNING ARTICLES

(76) Inventors: Jaime Marti Sala, Barcelona (ES); Alex Marti Mercade, Sant Cugat Del Valles (ES)

( * ) Notice: Subject to any disclaimer, the term of this patent is extended or adjusted under 35 U.S.C. 154(b) by 366 days.

(21) Appl. No.: 12/066,293

(22) PCT Filed: Sep. 8, 2006

(86) PCT No.: PCT/ES2006/000512
§ 371 (c)(1),
(2), (4) Date: Sep. 3, 2008

(87) PCT Pub. No.: WO2007/028848
PCT Pub. Date: Mar. 15, 2007

(65) Prior Publication Data
US 2008/0314717 A1    Dec. 25, 2008

(30) Foreign Application Priority Data
Sep. 9, 2005 (ES) .................................. 200502279

(51) Int. Cl.
*B65G 47/24* (2006.01)
(52) U.S. Cl. .................. 198/384; 198/392; 198/397.01; 221/170
(58) Field of Classification Search .................. 198/382, 198/383, 384, 392, 397.01, 397.05; 221/167, 221/169, 170, 203, 265
See application file for complete search history.

(56) References Cited

U.S. PATENT DOCUMENTS

| | | | |
|---|---|---|---|
| 3,295,659 A | | 1/1967 | Aidlin |
| 3,662,872 A | * | 5/1972 | Nalbach ................... 198/397.05 |
| 5,415,322 A | * | 5/1995 | Sala ............................... 221/169 |
| 6,065,587 A | * | 5/2000 | Schindel .................... 198/465.1 |
| 6,435,333 B1 | * | 8/2002 | Sala ............................... 198/384 |
| 6,557,691 B2 | * | 5/2003 | Ronchi .......................... 198/400 |
| 7,374,032 B2 | * | 5/2008 | Marti Mercade et al. .... 198/400 |

FOREIGN PATENT DOCUMENTS

| | | |
|---|---|---|
| EP | 0 065 866 | 12/1982 |
| EP | 0 578 602 A1 | 1/1994 |
| ES | 2 049 601 | 4/1994 |
| ES | 2 087 003 | 7/1996 |
| ES | 2 163 957 | 2/2002 |
| GB | 1 558 379 | 12/1979 |
| WO | WO 99/59904 | 11/1999 |
| WO | WO 01/40084 A1 | 6/2001 |
| WO | WO 03/078284 A1 | 9/2003 |

OTHER PUBLICATIONS

International Search Report for PCT International Application No. PCT/ES2006/000512 mailed Jan. 9, 2007.

\* cited by examiner

*Primary Examiner* — Douglas Hess
(74) *Attorney, Agent, or Firm* — RatnerPrestia (57) ABSTRACT

The invention relates to a machine for orienting and aligning articles, of the type that comprises: orientation cavities which can move along a closed path and which are equipped with an upper inlet for loading articles and an open base through which the articles can pass, a plurality of aligning conduits which are disposed below the orientation cavities, means for temporarily supporting the articles in the orientation cavities and for dropping same into the conduits, and support and/or end stop elements in each of the orientation cavities. In addition, each of the cavities comprises several seats or housings at different positions for receiving a first support and/or end stop element of the aforementioned support and/or end stop elements and retaining means for retaining said first support and/or end stop element in any of the seats or housings.

22 Claims, 5 Drawing Sheets

MACHINE FOR ORIENTING AND ALIGNING ARTICLES

This application is a U.S. National Phase application of PCT Application No. PCT/ES2006/000512, filed Sep. 8, 2006.

FIELD OF THE ART

The present invention relates to a machine for orienting and aligning articles, especially although not exclusively, lightweight empty containers. The machine of the present invention includes several orientation and/or aligning units integrating elements which can change position in order to adapt the properties for supporting and passing each unit to the width of different articles.

PRIOR STATE OF THE ART

Machines for orienting and aligning initially unorganized articles are common in several industrial sectors. More specifically, in the packaging sector, machines for standing up and aligning lightweight empty containers are used.

U.S. Pat. No. 3,295,659 describes a machine based on an operation principle which has become the most used principle in many types of machines for orienting and aligning articles. Such principle is based on supporting a differentiated geometrical configuration of the article, for example the neck in the case of many containers, whereas the article is dropped by gravity in order to stand the article up, for example on its base in the case of the containers. To that end the articles are first individually arranged in a plurality of orientation cavities in a horizontal and preoriented position, such that the differentiated geometrical configuration is indistinctly opposing either of the ends of the corresponding orientation cavity. Each of the articles is then dropped by gravity through an open base of the orientation cavity into an aligning conduit. In the orientation cavity there are support and/or end stop configurations intended to support said differentiated geometrical configuration whatever its relative position is with respect to the ends of the orientation cavity, so that the article always falls on its base into the aligning conduit. The machine adopts a rotating configuration in which a plurality of said cavities intended to receive an article are radially arranged on the periphery of a circular structure.

More recent machines of this type adopt an arrangement wherein the orientation cavities are tangentially aligned on the periphery of a rotating structure. At the upper part of the rotating structure there are arranged means for loading an article in each orientation cavity in the preoriented position starting from a large number of loosely unorganized articles. Each of the mentioned orientation cavities has an open base on an aligning conduit which is moved together with same, and between the orientation cavities and the aligning conduits a support plane is arranged supporting the articles in its corresponding orientation cavities. The support plane has an interruption in an area of the circular path through which the articles fall standing up from each orientation cavity to its corresponding aligning conduit. Thus, in the course of each round each orientation cavity is loaded with an article which is dropped properly oriented to its corresponding aligning conduit. Deflectors or other means finally transfer the containers oriented in a vertical position from the aligning conduits to an output conveyor.

Patent EP-A-0578602, of one of the current applicants, describes a machine of this type for orienting and aligning articles in which the orientation cavities and the aligning conduits are formed by individual units which can be replaced by others with different dimensions in order to adapt the machine to different articles. The machine includes quick coupling means which allow removing the individual units of the rotating structure and fixing them again in a relatively quick and simple manner. One drawback of this machine is that a complete set of orientation cavities and aligning conduits is needed for each type article, which implies an increase in manufacturing and storage costs.

International patent application WO 99/59904, of one of the current applicants, describes a machine for orienting and aligning articles of the type described above wherein some of the support and/or end stop configurations and walls of the orientation cavities and aligning conduits are assembled in different additional structures concentrically assembled on the rotating structure and provided with means for adjusting the angular position of the additional structures in relation to the rotating structure, and means for adjusting the radial position of some of such elements in relation to their additional structure. With this construction, the position of some of the support and/or end stop configurations and walls can be simultaneously adjusted in order to adapt the machine to different articles. This construction however is rather complex due to the superimposition of additional structures.

International patent application WO 01/40084, of one of the current applicants, describes a machine for orienting and aligning articles of the type described above wherein some of the support and/or end stop configurations of the orientation cavities are attached to moving elements which are actuated in order to selectively introduce or remove the support and/or end stop configurations in the cavities, reforming the inner space thereof according to the dimensions and shapes of a wide range of articles to be oriented. However, this construction requires a large number of such moving elements, for example pneumatic cylinders, which together with their pneumatic circuits and valve means imply a high construction, maintenance and use cost.

Patent EP-A-065866 mentions a machine for orienting and aligning articles with a series of housings on the periphery of a rotating disc in which adjustable orientation means sliding through several through grooves are installed. A similar arrangement also appears in patent GB-A-1558379. In both cases such orientation means allow their continuous adjustment by sliding, enabling a fixing possible at any chosen point but forcing each of the chosen positions to be very precisely measured and the assembly further implies a complex use and maintenance construction.

In view of the above short comings of the prior art, what is needed is a machine for orienting and aligning articles provided with means for adapting the orientation cavities and aligning conduits to different articles, which is of simple and cost-effective construction and which allows manually and quickly carrying out the adaptation and/or adjustment to different articles.

DESCRIPTION OF THE INVENTION

The present invention provides a machine for orienting and aligning articles of the type comprising a plurality of orientation cavities arranged in a moving arrangement which can move said orientation cavities along a closed path. Each of the orientation cavities is suitable for housing one of said articles, and the orientation cavities are provided with an open base through which the articles can pass. The machine includes loading means for loading the articles in said orientation cavities and a plurality of aligning conduits arranged in said moving arrangement below the orientation cavities, each of said aligning conduits equipped with a funnel-shaped upper inlet located below the open base of one of the orientation cavities for receiving an article from same. Between the open base of each orientation cavity and the upper inlet of the respective aligning conduit support means are interposed for temporarily supporting the articles in said orientation cavities and dropping same into the corresponding aligning conduits in a predetermined site of said closed path. In each of the orientation cavities support and/or end stop elements are arranged adapted to cooperate with parts of the article when it falls through the open base of the orientation cavity in order to give a predetermined orientation to the article inside the aligning conduit whatever its original position in the orientation cavity is. The machine according to the present invention is characterized in that each of the orientation cavities comprises several seats or housings, formed at several different positions, which can receive a first support and/or end stop element of said support and/or end stop elements, and retaining means for retaining said first support and/or end stop element in any of said seats or housings, whereby at least one dimension of the orientation cavity can be adapted to different articles by changing the first support and/or end stop element of one seat or another.

In an embodiment, each orientation cavity is formed by a front wall and a rear wall, in relation to the forward movement direction of the orientation cavity, and an inner side wall. In this case the outer closing of the cavities is made by a stationary outer casing of the machine, and the mentioned seats or housings and said retaining means are associated to said inner side wall of the cavity. In another embodiment each orientation cavity is further formed by an outer side wall, and a part of each of said seats or housings is associated to said outer side wall and another part of each of said seats or housings is associated to said inner side wall, said retaining means being associated either to the inner side wall, to the outer side wall, or to both.

In an embodiment, at least the inner end of the first support and/or end stop element comprises a material that can be magnetically attracted, and said retaining means comprise a magnetic strip fixed to the inner side wall at a suitable distance from the second openings so as to retain by magnetic attraction the first support and/or end stop element installed in any of the seats or housings. In another alternative embodiment the several seats are formed by a series of first elastic grippers arranged in said outer side wall and aligned with a series of second elastic grippers arranged in said inner side wall. The first support and/or end stop element is thus shaped as an elongated body with an outer end which can be secured in any of said first elastic grippers of the outer side wall and an inner end which can be secured in the corresponding aligned second opening of the inner side wall. The first and second elastic grippers here act at the same time as seats or housings and as retaining means for the first support and/or end stop element.

The aligning conduits are provided with several moving walls which allow the adaptation to different articles according to a construction different from those known to date.

The moving arrangement supporting the orientation and aligning units conventionally comprises a rotating circular structure assembled to rotate about a central axis, and the orientation cavities and the aligning conduits are arranged in alignment on the periphery of said rotating structure.

Each of the aligning cavities optionally forms an orientation unit removably attached to the moving arrangement by quick coupling means, and each of the aligning conduits forms an aligning unit removably attached to the moving arrangement by quick coupling means. Alternatively, each aligning cavity and its corresponding aligning conduit are attached to one another forming an orientation and aligning unit removably attached to the moving arrangement by quick coupling means.

With this construction, the machine of the present invention provides very simple means for adapting the machine to articles with different sizes and configurations by means of a simple manual operation for changing the position of the first support and/or end stop element, and/or for changing the position of an inner wall of each orientation cavity, as well as for changing the position of one or more walls of each aligning conduit. This operation can also be carried out more comfortably by removing the orientation cavities and aligning conduits of the rotating structure in order to make the changes in position and subsequently install them again as a result of quick coupling means, without needing to use tools.

BRIEF DESCRIPTION OF THE DRAWINGS

The previous and other advantages and features will be more fully understood from the following detailed description of several embodiments referring to the attached drawings, in which.

DETAILED DESCRIPTION OF SEVERAL EMBODIMENTS

Figure 1:
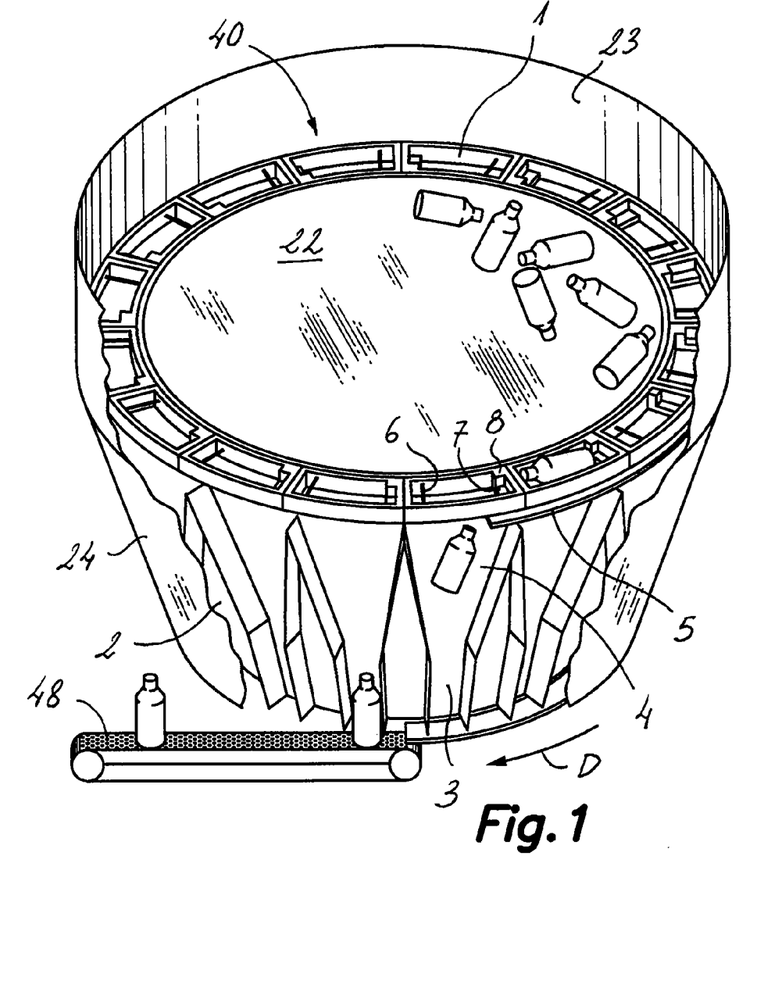
FIG. 1 is a general perspective view of a machine for orienting and aligning articles according to an embodiment of the present invention.

First in reference to FIG. 1, a machine for orienting and aligning articles according to an embodiment of the present invention is shown in a simplified manner. The machine comprises a plurality of orientation cavities 1 arranged in alignment on the periphery of a circular rotating structure 2 assembled to rotate about a central axis, such that the rotating structure 2 which can move said orientation cavities 1 along a closed circular path. Each of the orientation cavities 1 is suitable for housing one of said articles, and the machine comprises loading means for loading the articles in said orientation cavities 1. For example, the rotating structure 2 has an upper surface 22 at approximately the same level as the orientation cavities 1 and a surrounding wall 23 forming part of a stationary outer casing 24 surrounds the upper part of the rotating structure 2 and extends upwards, demarcating along with said upper surface 22 a hopper where the articles are loosely tossed in an unorganized fashion. The centrifugal force of the moving structure upon rotation pushes the articles towards the orientation cavities 1.

A plurality of aligning conduits 3 are arranged in said rotating structure 2 below the orientation cavities 1, such that the orientation cavities 1 and the aligning conduits 3 move together. The orientation cavities 1 are provided with an open base through which the articles can pass, and each of said aligning conduits 3 has a funnel-shaped upper inlet 4 located below the open base of one of the orientation cavities 1 to receive an article therefrom. Placed between the open base of each orientation cavity 1 and the upper inlet 4 of the respective aligning conduit 3 there are support means 5, for example, in the form of a stationary support plane 5, provided with an interruption in a section of said closed circular path. The mentioned support plane 5 acts for temporarily supporting the articles in said orientation cavities 1 and for dropping same through said interruption to the corresponding aligning conduits 3 in a predetermined location of said circular path.

The present invention is not limited to a type of machine provided with a rotating structure 2 such as the one shown in FIG. 1, but rather it can be applied to any machine provided with a moving arrangement 40 that can move said orientation cavities along a closed path. For example, the orientation cavities and their corresponding aligning conduits can form independent bodies hingedly connected together thus forming a train that is moved along said closed path, which is arranged in a stationary structure.

In any case, arranged in each of the orientation cavities 1 there are support and/or end stop elements 6, 7, 8 adapted to cooperate with parts of the article when said article falls through the open base of the orientation cavity 1 to give a predetermined orientation to the article inside the aligning conduit 3, whatever its original position is in the orientation cavity 1, in a manner that is well known in the state of the art. In the example that is illustrated, the articles are lightweight empty bottles and the parts thereof cooperating with the support and/or end stop elements 6, 7, 8 are the neck and the base. The machine includes deflectors or another device to finally transfer the vertically oriented containers from the aligning conduits 3 to an output conveyor 48.

Figure 2:
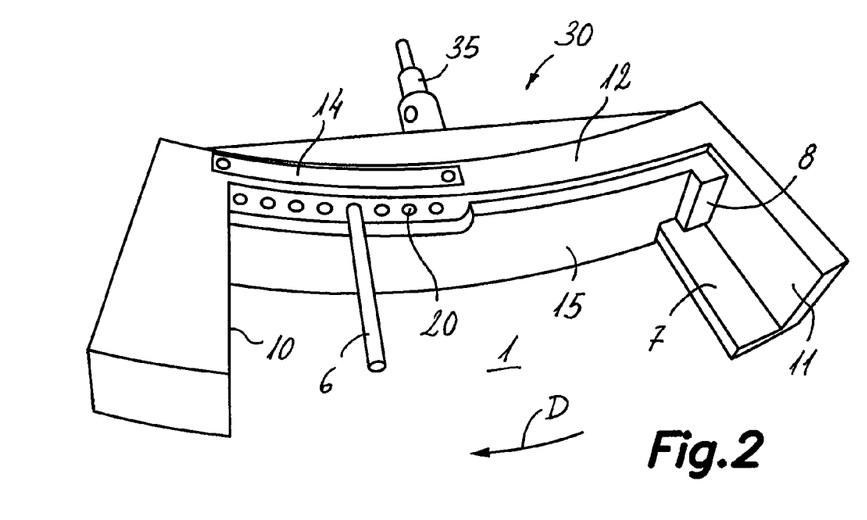
FIG. 2 is an upper perspective view of an orientation unit according to an embodiment.

FIG. 2 shows an embodiment of the orientation cavity 1, having a front wall 10 and a rear wall 11, in relation to the forward movement direction of the orientation cavity indicated by an arrow D, and an inner side wall 12. In this case, the orientation cavity 1 is closed on the outer part by the mentioned outer casing 24 of the machine. Formed on the inner side wall 12 there are seats or housings 20 in the form of a series of openings adapted to have inserted therein an inner end of a first support and/or end stop element 6 of said support and/or end stop elements 6, 7, 8. The mentioned inner end of the first support and/or end stop element 6 comprises a material that can be magnetically attracted, and the inner side wall 12 has associated thereto retaining means in the form of a magnetic strip 14 fixed to the upper part of the inner side wall 12, at a suitable distance from the seats or housings 20 so as to retain by magnetic attraction the first support and/or end stop element 6 installed in any of the seats or housings 20.

In the embodiment shown in FIG. 2, the front, rear and inner walls 10, 11, 12 forming each orientation cavity 1 are connected together forming an orientation unit 30, which is removably attached to the rotating structure 2 by conventional quick coupling means 35, such as those described in the aforementioned patent EP-A-0578602, for example.

Figure 3:
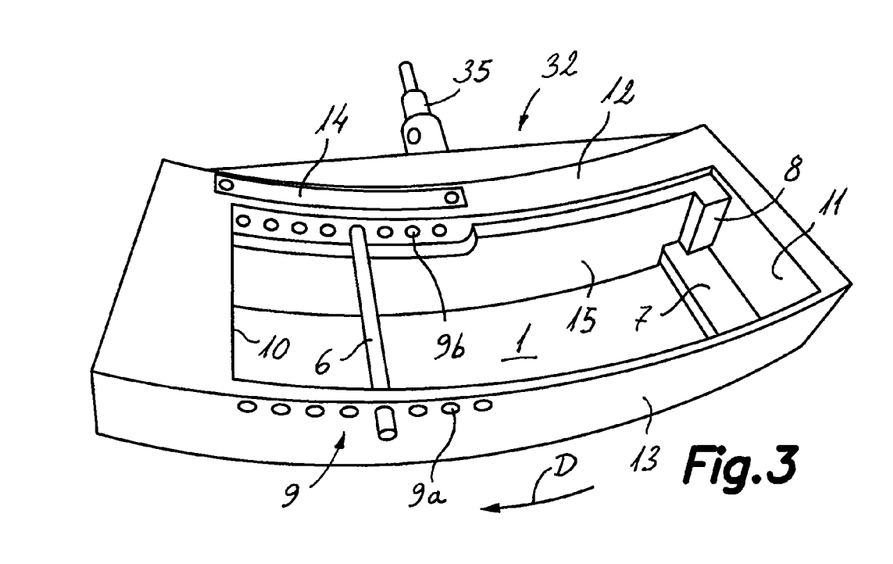
FIG. 3 is an upper perspective view of an orientation unit according to another embodiment.

FIG. 3 shows another embodiment of the orientation cavity 1 similar to that of FIG. 2. The difference is that in addition to front and rear walls 10, 11, and inner side wall 12, the orientation cavity 1 is formed by an outer side wall 13. This orientation cavity 1 incorporates several seats or housings 9 at several different positions. Each seat 9 has a part formed by a series of first openings 9a formed in said outer side wall 13 and another part formed by a series of second openings 9b formed in the inner side wall 12. The first opening 9a and the second opening 9b of each seat 9 are mutually opposite one another. The first support and/or end stop element 6 is shaped as an elongated body that can pass through any one of said first openings 9a of the outer side wall 13 and its inner end inserted in the corresponding opposing second opening 9b of the inner side wall 12. The first openings 9a formed in the outer side wall 13 are preferably through openings whereas the second openings 9b formed in said inner side wall 12 are blind openings, thereby limiting the insertion of the first support and/or end stop element 6. Here the inner side wall 12 also has retaining means associated thereto in the form of a magnetic strip 14 fixed to the upper part of the inner side wall 12, at a suitable distance from the seats or housings 20 so as to retain by magnetic attraction the first support and/or end stop element 6 installed in any of the seats 9. Alternatively, the mentioned magnetic strip could be associated to the outer side wall 13, or there could be two more magnetic strips installed in both inner and outer side walls 12, 13 with an equivalent result.

In the embodiment shown in FIG. 3, the front, rear, inner and outer walls 10, 11, 12, 13, forming each orientation cavity 1 are connected together forming an orientation unit 32 that is removably attached to the rotating structure 2 by quick coupling means 35.

In the orientation units 30, 32 illustrated in FIGS. 2 and 3, the seats or housings 9, 20 are adjacent to the front wall 10 of the orientation cavity 1, such that once the first support and/or end stop element 6 is installed, it will be more or less close to the front wall 10, whereas formed next to the opposite rear wall 11 there is a second support and/or end stop element 7 projecting inwardly in the orientation cavity 1. Arranged next to said second support and/or end stop element 7 there is a side end stop 8 configured to cooperate with the second support and/or end stop element 7. Furthermore, arranged next to the inner side wall 12 there is a moving side plate 15 substantially parallel to the inner side wall 12. This moving side plate 15 is assembled such that the position in the orientation cavity 1 can be changed, whereby at least another dimension of the orientation cavity 1 can be adapted to different articles by changing the position of the moving side plate 15. Advantageously, the side end stop 8 is fixed to the moving side plate 15, whereby the position can be changed along with such plate.

Figure 4:
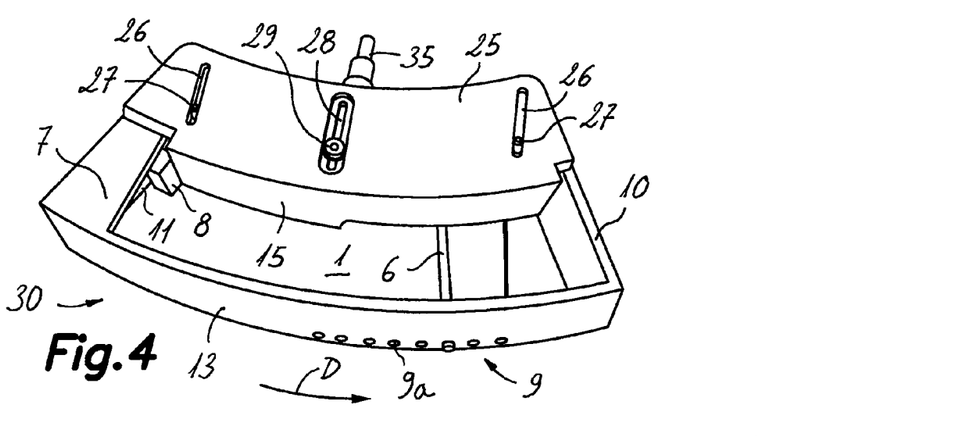
FIG. 4 is a lower perspective view of the orientation unit of FIG. 3.

FIG. 4 shows a bottom view of the orientation unit 32 of FIG. 3 and is useful for explaining the assembly of the moving side plate 15 with the understanding that a similar assembly would also be useful for the orientation unit 30 of FIG. 2. Therefore, as shown in FIG. 4, the moving side plate 15 projects from the lower part of the inner side wall 12 and is attached to a lower plate 25 superimposed on a lower surface of the inner side wall 12. Formed in the mentioned lower plate 25 there are a pair of mutually parallel guide grooves 26 in which lugs 27 fixed in the lower surface of the inner side wall 12 are inserted, and a fixing groove 28, parallel to said guide grooves 26, through which a lock screw 29 coupled to a threaded hole formed in the lower surface of the inner side wall 12 passes.

Figure 5:
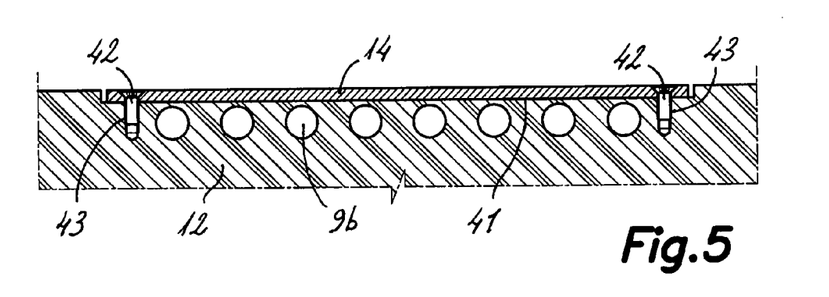
FIG. 5 is a cross-sectional schematic detail of retaining means for retaining a support and/or end stop element of the orientation unit of FIG. 2 or of FIG. 3.

FIG. 5 schematically shows the assembly of the magnetic strip 14 forming part of the retaining means in the orientation units 30, 32 described above in relation to FIGS. 2 and 3. Formed in an upper surface of the inner side wall 12 there is a depression 41 in which the magnetic strip 14 is housed such that an upper surface of the magnetic strip 14 is substantially flush with the upper surface of the inner side wall 12. Screws 42 coupled to corresponding threaded holes 43 formed in said depression 41 of the inner side wall 12 pass through holes of the magnetic strip 14. The second openings 9b formed in said inner side wall 12 as part of the seats 9 have a longitudinal axis substantially parallel to the magnetic strip 14 and a portion of the inner wall of the second openings 9b is very close to the surface of the depression 41. Therefore the inner end of the first support and/or end stop element 6, that can be magnetically attracted, inserted in one of the second openings 9b is very close to the magnetic strip 14 housed in the depression 41, and therefore the first support and/or end stop element 6 is retained in position by magnetic attraction.

In an alternative embodiment not shown, the magnetic strip is fixed in a rear surface of the inner side wall 12 and the second openings 9b have a longitudinal axis substantially perpendicular to the magnetic strip 14. In this case, the inner end that can be magnetically attracted of the first support and/or end stop element 6 inserted in one of the second openings 9b is very close to the magnetic strip 14 or in contact with same if the second openings 9b are through openings and limited by the magnetic strip 14.

The orientation units 30, 32 illustrated in FIGS. 2 and 3 also allow some variations. For example, the first and second openings 9a, 9b forming the seats 9 could be formed next to the rear wall 11 instead of the front wall 10, and accordingly the second support and/or end stop element 7 would be next to the front wall 10 instead of the rear wall 11. In the orientation unit 32 illustrated in FIG. 3, the moving side plate 15 could be arranged next to the outer side wall 13 instead of the inner side wall 12, and with an alternating guiding and fixing groove device on the lower superficies of the front and rear walls.

Figure 6:
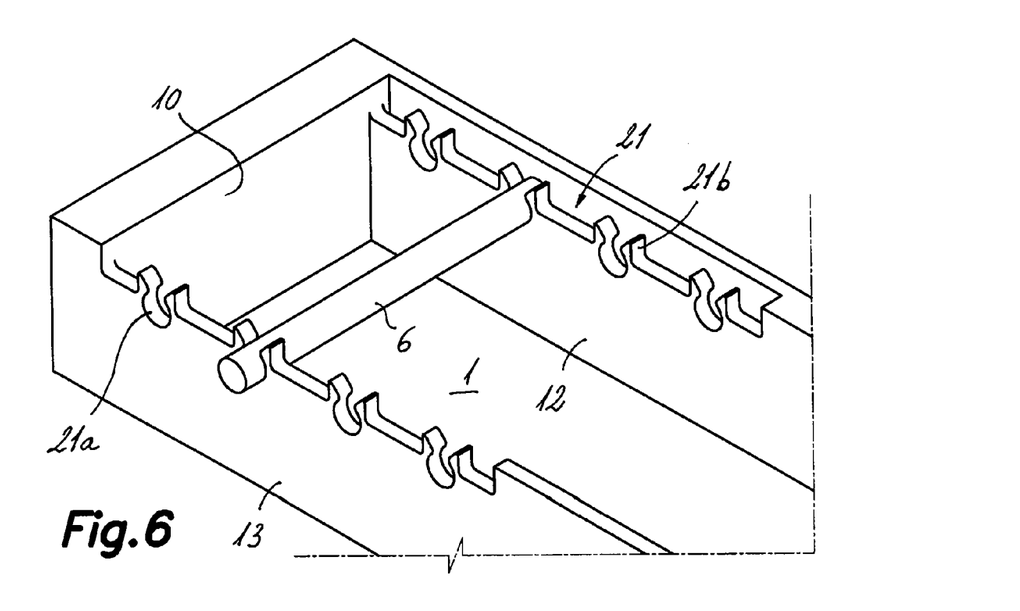
FIG. 6 is a partial perspective view of an orientation unit according to yet another embodiment.

An alternative embodiment is described below in relation to FIG. 6 for the seats or housings of the orientation cavity 1, which have in common with the embodiment shown in FIG. 3 the incorporation of several seats or housings 21 at several different positions that can receive the first support and/or end stop element 6, and retaining means for retaining said first support and/or end stop element 6 in any of said seats or housings 21. Each of said seats or housings 21 has a part 21a associated to the outer side wall 13 and another part 21b associated to the inner side wall 12. More specifically, the several seats or housings 21 here are formed by a series of first elastic grippers 21a arranged in said outer side wall 13 and a series of second elastic grippers 21b arranged in said inner side wall 12. The first and second elastic grippers 21a, 21b of each seat 21 are mutually aligned and can be formed integrally with the corresponding inner and outer side walls 12, 13 or they can be inserts.

The first support and/or end stop element 6 is shaped as an elongated body having an outer end that can be held in any one of said first elastic grippers 21a of the outer side wall 13 and an inner end that can ser held in the corresponding aligned second opening 21b of the inner side wall 12, and the first and second elastic grippers 21a, 21b can elastically apply pressure on the ends of the first support and/or end stop element 6. Therefore the first and second elastic grippers 21a, 21b at the same time act as seats or housings and as retaining means for the first support and/or end stop element 9. It can therefore be observed here that the retaining means are associated to both inner and outer side walls 12, 13. However, a variant incorporating elastic grippers, for example, in only one of the inner or outer side walls 12, 13, and simple seats or housings simples, for example, openings suitable for the insertion of one end of the first support and/or end stop element 6, in the other one would fall within the scope of the present invention.

Figure 7:
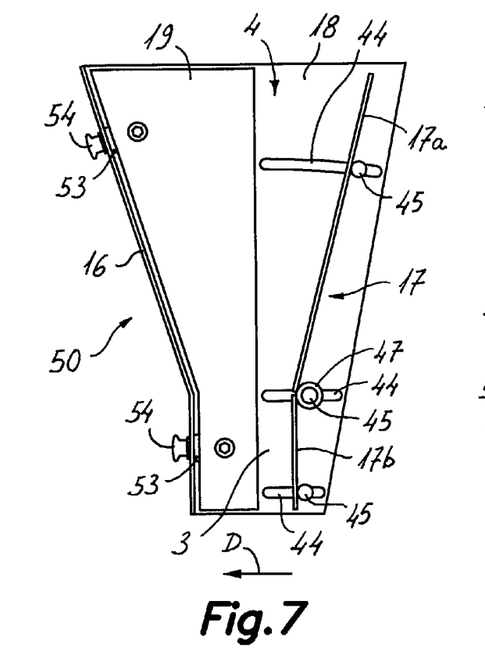
FIGS. 7, 8 and 9 are front elevational, side elevational and plan views, respectively, of an aligning unit according to an embodiment.
Figure 8:
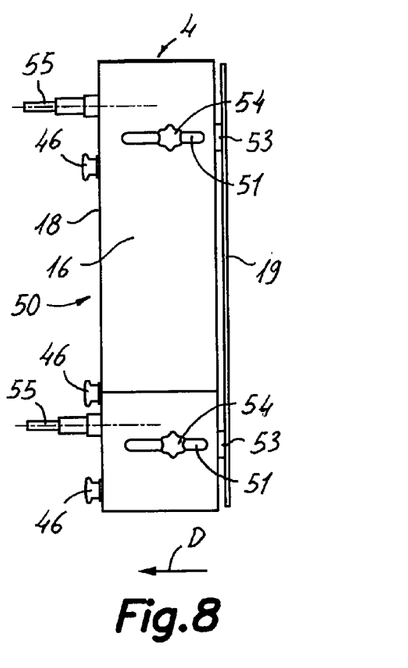
Figure 9:
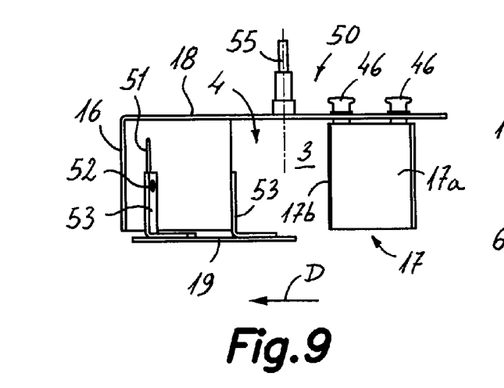

FIGS. 7, 8 and 9 show one of the aligning conduits 3 according to an embodiment of the present invention, which is formed by a front wall 16 and a rear wall 17 formed in relation to the forward movement direction of the orientation cavity indicated by an arrow D, and an inner side wall 18. The front wall 16 is fixed in relation to the inner side wall 18, whereas the rear wall 17 is assembled such that it can be changed from position in relation to the front wall 16. To that end, the inner side wall 18 includes grooves 44 through which threaded ends of rods 45 attached to the rear wall 17 and coupled to nuts 46 in the rear face of the inner side wall 18 pass. Advantageously, the mentioned nuts 46 are in the form of manual operation knobs, for example.

The rear wall 17 which, as described, is assembled such that it can be changed from position, includes an inclined upper portion 17a contributing to forming the mentioned funnel-shaped upper inlet 4, and a lower portion 17b contributing to forming the aligning conduit 3. The upper portion 17a is assembled such that the inclination thereof can be changed in relation to the lower portion 17b. To that end, one of the rods 45 is attached to the upper end of the lower portion 17b and is surrounded by a sleeve 47 attached to the lower end of the upper portion 17a of the rear wall 17, or vice versa. A relative rotation between the sleeve 47 and the rod 44 acts as a hinge between the upper portion 17a and the lower portion 17b of the rear wall 17 when the corresponding nut 46 is loosened. Notice the change in position of the upper and lower portions 17a, 17b of the rear wall can affect both their movement and their inclination.

With this construction, at least one dimension of the upper inlet 4 can be adapted to different articles by changing the inclination of said upper portion 17a regardless of the clearance area or dimension of the aligning conduit 3 formed by the position of the lower portion 17b of the rear wall 17 in relation to the other rear or front wall 16, and at least one dimension of the aligning conduit 3 can be adapted to different articles by changing the position the lower portion of the rear wall 17.

Alternatively, the rear wall 17 could be a one-piece movably assembled wall instead of integrating the two upper and lower portions 17a, 17b. The rear wall could also be the fixed wall and the front wall could be the wall assembled such that the position in relation to the front wall could be changed, either in one piece or in two portions, with an equivalent result.

The aligning conduit 3 is furthermore formed by an outer side wall 19, which is assembled such that the position in relation to the inner side wall 18 can be changed, whereby at least another dimension of the aligning conduit 3 can be adapted to different articles by changing the position of the outer side wall 19. To that end, the front side wall 16 includes grooves 51 through which threaded ends of rods 52 attached to angle brackets 53 integral with the outer side wall 19 and coupled to nuts 54 in the outer face of the front side wall 16 pass. Advantageously, the mentioned nuts 54 are in the form of manual operation knobs for example.

The front, rear, inner and outer walls 16, 17, 18, 19 forming each aligning conduit 3 according to the embodiment of the FIGS. 7 to 9 are connected together forming an aligning unit 50 adapted to be removably attached to the rotating structure 2 by quick coupling means 55.

Figure 10:
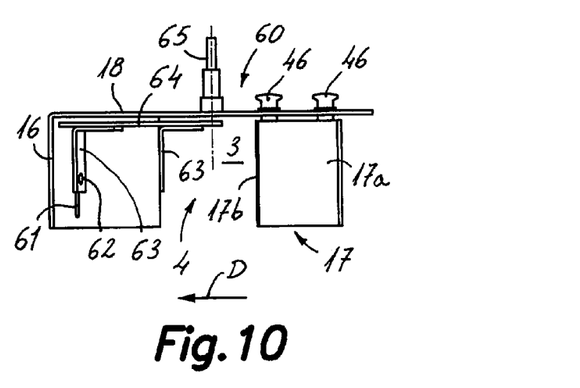
FIG. 10 is a view similar to FIG. 9 showing another embodiment of an aligning unit.

FIG. 10 shows an alternative embodiment similar to the embodiment described in relation to FIGS. 7, 8 and 9 except in that the aligning conduit 3 does not have an outer side wall, which in this case will be provided by the stationary outer casing 24. Here, arranged next to the inner side wall 18 there is a moving plate 64, substantially parallel to the inner side wall 18. The moving plate 64 is assembled such that the position in relation to the inner side wall 18 can be changed for the purpose of adapting the other dimension of the aligning conduit 3 to different articles. To that end, the front side wall 16 includes grooves 61 through which threaded ends of rods 62 attached to angle brackets 63 integral with the moving plate 64 and coupled to nuts (not shown in FIG. 10) in the outer face of the front side wall 16 pass.

The front, rear and inner walls 16, 17, 18 forming each aligning conduit 3 according to the embodiment of FIG. 10 are connected together forming an aligning unit 60 adapted to be removably attached to the rotating structure 2 by quick coupling means 65.

Figure 11:
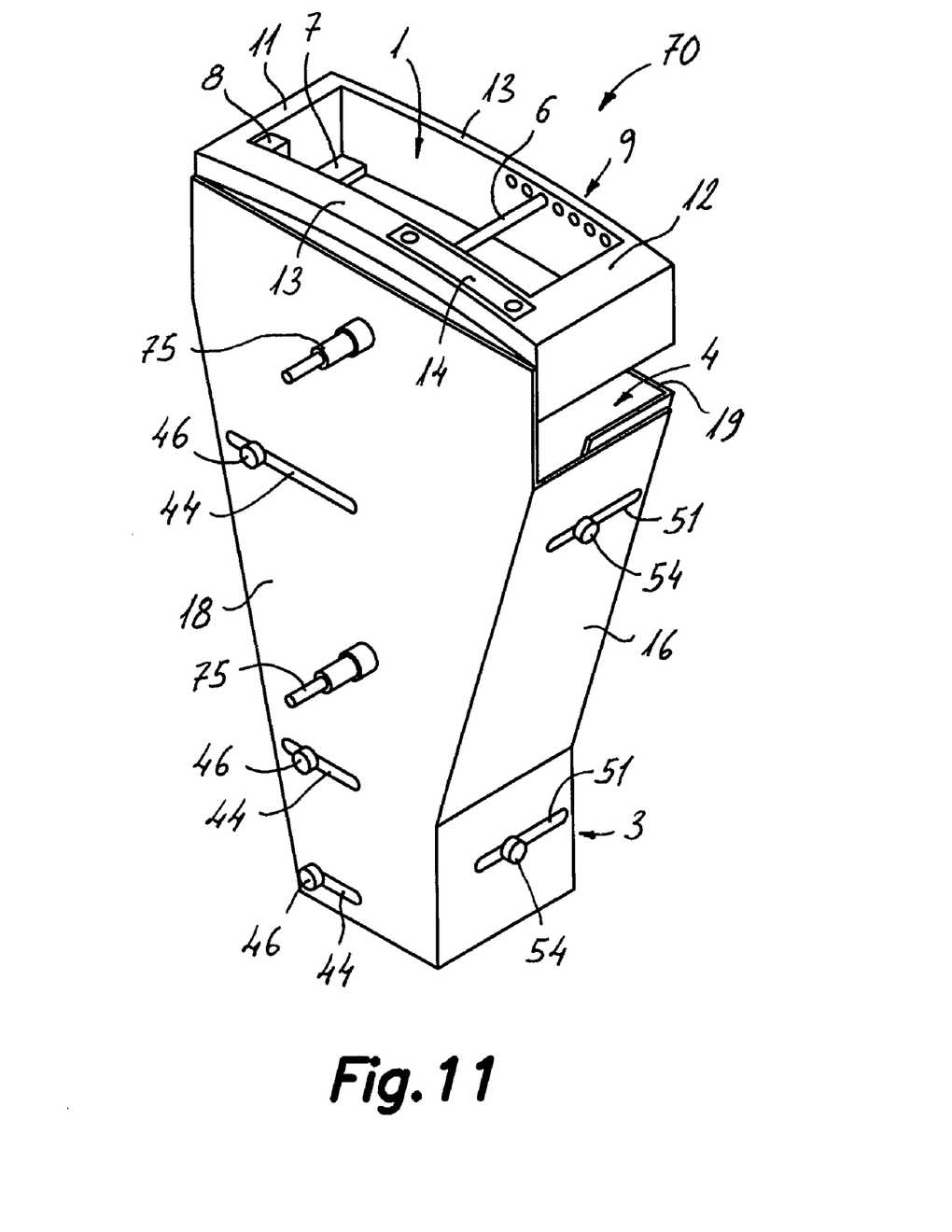
FIG. 11 is a rear perspective view of an orientation and aligning unit according to an embodiment.

FIG. 11 finally shows an orientation and aligning unit 70 integrating front, rear, inner and outer walls 10, 11, 12, 13 forming an orientation cavity 1 similar to the one described above in relation to FIG. 3, and front, rear, inner and outer walls 16, 17, 18, 19 forming each aligning conduit 3 similar to that described above in relation to FIGS. 7 to 9. In this case, for example, the rear wall 18 of the aligning conduit 3 extends upwards and acts as a support for the orientation cavity 1. The orientation and aligning unit 70 is adapted to be removably attached to the rotating structure 2 by quick coupling means 75. There is gap between the orientation cavity 1 and the aligning conduit 3 in which, when the orientation and aligning unit 70 is attached to the rotating structure 2, the mentioned stationary support plane 5, which is generally attached to the outer casing 24, will be inserted.

According to an alternative embodiment not shown, the orientation and aligning unit has front, rear and inner walls 10, 11, 12 forming an orientation cavity 1 similar to the one described above in relation to FIG. 2, and front, rear and inner walls 16, 17, 18 forming an aligning conduit 3 similar to the one described above in relation to FIG. 10. In this embodiment, the orientation cavity 1 and the aligning conduit 3 are closed by means of the stationary outer casing 24. This orientation and aligning unit is also adapted to be removably attached to the rotating structure 2 by quick coupling means.

In relation to the solution proposed by patent EP-A-0578602, which describes replacing orientation or aligning units with other ones so as to be adapted to different article formats to be treated, this invention in fact describes a different process of adaptation or adjustment according to which each of said orientation and/or aligning units of the machine will be accessed and the adaptation or adjustment is obtained by modifying in each unit (generally in a uniform or common manner for the set of units) the position of several elements forming supports, end stops or guides, also determining the chosen position of these elements in each unit an adjustment of the support, access or passage of the articles therethrough. This change of position involves disassembling the elements from a first position and fixing them in a second position for which purpose different assembly solutions, preferably without needing tools, are provided.

Said adaptation or adjust will be made advantageously on the outside of the machine for which purpose the units will have removable (preferably quick) connecting means, as described, but this invention also protects the action on each unit without removing it from the support arrangement, generally a rotating structure as that depicted in FIG. 1.

A person skilled in the art will be able to introduce variations and modifications in the embodiments shown and described without departing from the scope of the present invention as it is defined in the attached claims.

The invention claimed is:

1. A machine for orienting and aligning articles, comprising:
   a plurality of orientation cavities arranged in a moving arrangement which can move said orientation cavities along a closed path, the orientation cavities being provided with an upper inlet for loading articles and with an open base through which the articles can pass;
   a plurality of aligning conduits arranged in said moving arrangement below the orientation cavities, each of said aligning conduits having a funnel-shaped upper inlet located below the open base of one of the orientation cavities for receiving an article from same;
   means for temporarily supporting the articles in said orientation cavities and dropping same into the corresponding aligning conduits in a predetermined site of said closed path; and
   support and/or end stop elements in each of the orientation cavities adapted to cooperate with some parts of the article when it drops through the open base of the orientation cavity in order to give a predetermined orientation to the article inside the aligning conduit,
   wherein each orientation cavity is formed by a front wall and a rear wall in relation to the forward movement direction of the orientation cavity, and an inner side wall, a first support and end stop element of said support and/or end stop elements being located near said front wall and a second support element and a third end stop element of said support and/or end stop elements being located adjacent said rear wall,
   wherein each of the orientation cavities comprises several seats or housings located at several different positions of at least said inner side wall for receiving said first support and end stop element, and retaining means for retaining said first support and end stop element in any of said seats or housings, such that at least one dimension of the orientation cavity can be adapted to different articles by changing the first support and end stop element from a seat or housing to another.

2. A machine according to claim 1, wherein each orientation cavity is further formed by an outer side wall, and a part of each of said seats or housings is further associated to said outer side wall and another part of each of said seats or housings is associated to said inner side wall, said retaining means being associated either to the inner side wall, to the outer side wall or to both.

3. A machine according to claim 2, wherein the several seats or housings are formed by a series of first openings formed in said outer side wall and opposing a series of second openings formed in said inner side wall, the first support and end stop element being shaped as an elongated body which can be passed through any one of said first openings of the outer side wall and its inner end inserted in the corresponding opposing second opening of the inner side wall.

4. A machine according to claim 3, wherein at least said inner end of the first support and end stop element comprises a material that can be magnetically attracted, and said retaining means comprise a magnetic strip fixed to the inner side wall at a suitable distance from the second openings so as to retain by magnetic attraction the first support and end stop element installed in any of the seats or housings.

5. A machine according to claim 4, wherein said first openings formed in the outer side wall are through openings and said second openings formed in said inner side wall are blind openings, such that they limit the insertion of the first support and end stop element.

6. A machine according to claim 3, wherein said first openings formed in the outer side wall are through openings and said second openings formed in said inner side wall are blind openings, such that they limit the insertion of the first support and end stop element.

7. A machine according to claim 2, wherein the front, rear, inner and outer walls forming each orientation cavity are connected to one another forming an orientation unit removably attached to the moving arrangement by quick coupling means.

8. A machine according to claim 2, wherein the seats or housings are adjacent to one of said front or rear walls of the orientation cavity, a second support and/or end stop element being formed next to the other of the front or rear walls, projecting into the orientation cavity.

9. A machine according to claim 2, wherein each of the aligning conduits is formed by a front wall and a rear wall, in relation to the forward movement direction of the orientation cavity, and an inner side wall, at least one of said front or rear walls being assembled such that the position in relation to the other of the rear or front walls can be changed, such that at least one dimension of the aligning conduit can be adapted to different articles by changing the position of the corresponding front or rear wall, and in that the front or rear wall, which is assembled such that the position thereof can be charged, includes an upper portion, which contributes to forming said funnel-shaped upper inlet, and a lower portion, said upper portion being assembled such that the inclination with regard to said lower portion can be changed, such that at least one dimension of the upper inlet can be adapted to different articles by changing the inclination of said upper portion regardless of the dimension of the aligning conduit formed by the position of the lower portion of the front or rear wall in relation to the other rear or front wall.

10. A machine according to claim 1, wherein the seats or housings are adjacent to one of said front or rear walls of the orientation cavity, a second support and/or end stop element being formed next to the other of the front or rear walls, projecting into the orientation cavity.

11. A machine according to claim 1, further comprising a side end stop arranged next to said second support and end stop element, said side end stop being configured to cooperate with the second support and end stop element.

12. A machine according to claim 11, further comprising a moving side plate adjacent and substantially parallel to one of the inner or outer side walls, said moving side plate being assembled such that the position thereof in the orientation cavity can be changed, such that at least another dimension of the orientation cavity can be adapted to different articles by changing the position of the moving side plate.

13. A machine according to claim 12, wherein said side end stop is fixed to the moving side plate and the position of the side end stop can be changed together with the moving side plate.

14. A machine according to claim 1, wherein the front, rear and inner walls forming each orientation cavity are connected to one another forming an orientation unit removably attached to the moving arrangement by quick coupling means.

15. A machine according to claim 1, wherein the moving arrangement comprises a circular rotating structure assembled to rotate on a central axis, and the orientation cavities are arranged in alignment on the periphery of said rotating structure.

16. A machine for orienting and aligning articles, comprising:
a plurality of orientation cavities arranged in a moving arrangement which can move said orientation cavities along a closed path, the orientation cavities being provided with an upper inlet for loading articles and with an open base through which the articles can pass;
a plurality of aligning conduits arranged in said moving arrangement below the orientation cavities, each of said aligning conduits having a funnel-shaped upper inlet located below the open base of one of the orientation cavities for receiving an article from same;
means for temporarily supporting the articles in said orientation cavities and dropping same into the corresponding aligning conduits in a predetermined site of said closed path; and
support and/or end stop elements in each of the orientation cavities adapted to cooperate with some parts of the article when it drops through the open base of the orientation cavity in order to give a predetermined orientation to the article inside the aligning conduit,
wherein each of the orientation cavities comprises several seats or housings at several different positions for receiving a first support and/or end stop element of said support and/or end stop elements, and retaining means for retaining said first support and/or end stop element in any of said seats or housings, such that at least one dimension of the orientation cavity can be adapted to different articles by changing the first support and/or end stop element from a seat or housing to another,
each orientation cavity is formed by a front wall and a rear wall in relation to the forward movement direction of the orientation cavity, and an inner side wall,
said seats or housings and said retaining means being associated to at least said inner side wall,
each orientation cavity is further formed by an outer side wall, and a part of each of said seats or housings is further associated to said outer side wall and another part of each of said seats or housings is associated to said inner side wall, said retaining means being associated either to the inner side wall, to the outer side wall or to both, and
the several seats or housings are formed by a series of first elastic grippers arranged in said outer side wall and aligned with a series of second elastic grippers arranged in said inner side wall, the first support and end stop element being shaped as an elongated body with an outer end which can be secured in any one of said first elastic grippers of the outer side wall and an inner end which can be secured in the corresponding aligned second elastic gripper of the inner side wall, said first and second elastic grippers acting as seats or housings and as retaining means for the first support and end stop element.

17. A machine for orienting and aligning articles, comprising:
a plurality of orientation cavities arranged in a moving arrangement which can move said orientation cavities along a closed path, the orientation cavities being provided with an upper inlet for loading articles and with an open base through which the articles can pass;
a plurality of aligning conduits arranged in said moving arrangement below the orientation cavities, each of said aligning conduits having a funnel-shaped upper inlet located below the open base of one of the orientation cavities for receiving an article from same;
means for temporarily supporting the articles in said orientation cavities and dropping same into the corresponding aligning conduits in a predetermined site of said closed path; and
support and/or end stop elements in each of the orientation cavities adapted to cooperate with some parts of the article when it drops through the open base of the orientation cavity in order to give a predetermined orientation to the article inside the aligning conduit, wherein each of the orientation cavities comprises several seats or housings at several different positions for receiving a first support and/or end stop element of said support and/or end stop elements, and retaining means for retaining said first support and/or end stop element in any of said seats or housings, such that at least one dimension of the orientation cavity can be adapted to different articles by changing the first support and/or end stop element from a seat or housing to another, each orientation cavity is formed by a front wall and a rear wall in relation to the forward movement direction of the orientation cavity, and an inner side wall, said seats or housings and said retaining means being associated to at least said inner side wall, and each of the aligning conduits is formed by a front wall and a rear wall, in relation to the forward movement direction of the orientation cavity, and an inner side wall, at least one of said front or rear walls being assembled such that the position in relation to the other of the rear or front walls can be changed, such that at least one dimension of the aligning conduit can be adapted to different articles by changing the position of the corresponding front or rear wall, and in that the front or rear wall, which is assembled such that the position thereof can be changed, includes an upper portion, which contributes to forming said funnel-shaped upper inlet, and a lower portion, said upper portion being assembled such that the inclination with regard to said lower portion can be changed, such that at least one dimension of the upper inlet can be adapted to different articles by changing the inclination of said upper portion regardless of the dimension of the aligning conduit formed by the position of the lower portion of the front or rear wall in relation to the other rear or front wall.

18. A machine according to claim 17, wherein each of the aligning conduits is also formed by an outer side wall and at least one of said inner or outer side walls is assembled such that the position thereof in relation to the other of the outer or inner side walls can be changed, such that at least another dimension of the aligning conduit can be adapted to different articles by changing the position of the corresponding inner or outer side wall.

19. A machine according to claim 18, wherein the front, rear, inner and outer walls forming each aligning conduit are connected to one another forming an aligning unit removably attached to the moving arrangement by quick coupling means.

20. A machine according to claim 18, wherein the front, rear, inner and outer walls forming each orientation cavity, and the front, rear, inner and outer walls forming each aligning conduit, are connected to one another forming an orientation and aligning unit removably attached to the moving arrangement by quick coupling means.

21. A machine according to claim 17, wherein the front, rear and inner walls forming each aligning conduit are connected to one another forming an aligning unit removably attached to the moving arrangement by quick coupling means.

22. A machine according to claim 17, wherein the front, rear and inner walls forming each orientation cavity, and the front, rear and inner walls forming each aligning conduit, are connected to one another forming an orientation and aligning unit removably attached to the moving arrangement by quick coupling means.

* * * * *